United States Patent [19]

McDowell et al.

[11] 3,714,199

[45] Jan. 30, 1973

[54] METHYLENE DIOXYAMINE

[75] Inventors: Curtis S. McDowell, Edwards; Claude Merrill, Lancaster, both of Calif.

[73] Assignee: The United States of America as represented by the Secretary of the Air Force

[22] Filed: March 17, 1970

[21] Appl. No.: 24,945

[52] U.S. Cl.............260/350, 149/109, 260/583 DD
[51] Int. Cl.................................................C07c 83/00
[58] Field of Search...............260/584 R, 584 C, 350

[56] References Cited

UNITED STATES PATENTS 3,440,251  4/1969  Pilipovich..........................260/350
3,383,417  5/1968  Lichtenwalter...................260/584 R

*Primary Examiner*—Leland A. Sebastian
*Attorney*—Harry A. Herbert, Jr. and William J. O'Brien

[57] ABSTRACT

A method for synthesizing the novel compound methylenedioxyamine through a reaction which involves the hydrolysis of methylene-O,O'-bis (ethylacethydroximate).

2 Claims, No Drawings

METHYLENE DIOXYAMINE

BACKGROUND OF THE INVENTION

This invention relates to a new compound and to a method for its preparation. More particularly, this invention concerns itself with the synthesis of methylenedioxyamine and to a process for effecting that synthesis. Methylenedioxyamine, the novel compound of this invention, is a useful intermediate or precursor in the formation of methylenedioxyamine diperchlorate. The diperchlorate salt is formed by a hydrolytic reaction between methylenedioxyamine and perchloric acid. The compound of this invention also finds utility as a fuel or monopropellant in rocket propulsion systems.

SUMMARY OF THE INVENTION

In the present invention, the synthesis of methylenedioxyamine is accomplished by reacting a solvent mixture of methylene- '-bis (ethylacethydroximate) and 10 percent excess concentrated hydrochloric acid.

The reaction is continued at a temperature and for a period of time sufficient to hydrolyze the methylene-0,0'-bis (ethylacethydroximate). Generally, reaction times of from about 15 minutes to 24 hours at temperatures ranging from 0° to 100° C have been found suitable. A solvent such as ether, glyme, diglyme, nitromethane, or other suitable solvents of similar polarity may be used as the solvent component. The resultant hydrolytic reaction product is methylenedioxyamine dihydrochloride which, in turn, is neutralized with a suitable base such as sodium or potassium hydroxide in a suitable solvent such as methanol or ethanol. This gives methylenedioxyamine upon filtration and distillation of the solvent phase.

Accordingly, the primary object of this invention is to provide a new compound and a method for its preparation.

Another object of this invention is to provide a method for the synthesis of methylenedioxyamine.

The above and still other objects and advantages of this invention will become readily apparent upon consideration of the following detailed description thereof.

DESCRIPTION OF THE PREFERRED EMBODIMENT

In accordance with this invention, it has been found that the above-noted objects can be accomplished by a reaction in which methylene-0,0'-bis (ethylacethydroximate) is hydrolyzed using 10 percent excess concentrated hydrochloric acid in either glyme or some other suitable solvent of similar polarity. The resultant produce is methylenedioxyamine dihydrochloride which, in turn, is neutralized in a solvent mixture of either sodium or potassium hydroxide to give methylene dioxyamine after filtration and distillation of the solvent phase.

The reaction which is believed to take place during the synthesis of the novel compound of this invention is illustrated by the following schematic representation:

(I)
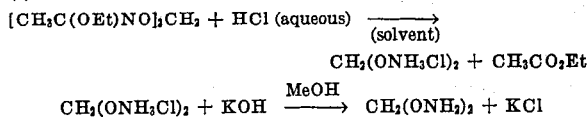

As mentioned hereinabove, in order to effect the synthesis of methylenedioxyamine according to the process of the invention, a quantity of a solvent such as diglyme, glyme, ether, nitromethane or other solvent of similar polarity is added to methylene-0,0'-bis (ethylacethydroximate). Concentrated hydrochloric acid is then added to the mixture, 10 percent in excess of stoichiometry, and the mixture is stirred preferably at a temperature of approximately 40°–50° C for about 15 minutes to 2 hours. The resultant white solid is filtered from the reaction mixture, washed with a suitable solvent, such as ether, and dried in air. The white solid methylenedioxyamine dihydrochloride is then taken up in ethanol (methanol or other solvents of appropriate polarity may be used) and treated with a stoichiometric quantity of base, such as potassium hydroxide or sodium hydroxide. The resultant mixture is filtered, dried, and the filtrate distilled to partially remove the solvent. The remaining solvent-dioxyamine mixture is then vacuum distilled to yield the free methylenedioxyamine.

In order to further illustrate to those skilled in the art the best mode of operation for the present invention, there is presented the following detailed example. This example, however, is presented for purposes of illustration only and is not to be considered as limiting the scope of the invention in any way.

EXAMPLE

To 100 ml of dry diglyme was added 10.0g (0.046 mole) of methylene-0,0'-bis (ethylacethydroximate) and 8.4 ml (10 percent excess) of concentrated hydrochloric acid. The mixture was stirred at 50° C for 15 minutes, filtered and the solid washed with two 50 ml portions of ether. The resultant solid passed a melting point of 154°–155° C and, when dried, weighed 6.5g (94 percent).

Analysis calculated for C H$_8$Cl$_2$N$_2$O$_2$: C, 7.95; H, 5.34; N, 18.54: Cl, 47.0: Analysis found to be: C, 8.1; H, 5.3; N, 18.5; Cl 46.1. Infrared absorption spectra was found to be compatible with the assigned structure for CH$_2$(ONH$_2$·HCl)$_2$ To 70cc of methyl alcohol was added 3.30g of 98 percent sodium hydroxide (0.0825 mole). After the sodium hydroxide dissolved, 6.07g (0.0402 mole) of the methylenedioxyamine dihydrochloride prepared above was added and the mixture stirred for 1 hour. The resultant precipitate was filtered and washed with methyl alcohol. The filtrate was dried over anhydrous calcium sulfate and refiltered. The methyl alcohol was evaporated on a rotary evaporator under reduced pressure at 30°–50° C. The resultant oil was distilled in a molecular still to give 2.34g (75 percent) of a colorless oil, methylenedioxyamine with a melting point of −8° to −9° C and a boiling point of 67° C at 3 mm. Infrared absorption and nuclear magnetic resonance spectra were compatible with the assigned structure.

Analysis calculated for C H$_6$O$_2$N$_2$: C, 15.40; H, 7.7; N, 35.92; Analysis found to be: C, 15.8; H, 7.6; N, 35.92.

We claim:

1. The compound, methylenedioxyamine.

2. A method for the synthesis of methylenedioxyamine which comprises the steps of (1) hydrolyzing a solvent mixture of methylene-0,0'-bis (ethylacethydroximate) and hydrochloric acid, (2) filtering said hydrolytic reaction product, (3) neutralizing a solvent mixture of said filtered reaction product and (4) separating said neutralized filtrate from said solvent by distillation.

* * * * *